United States Patent [19]

Corbellini et al.

[11] 4,194,992

[45] Mar. 25, 1980

[54] METHOD FOR THE POLYMERIZATION OF OLEFINES AND MEANS SUITABLE THERETO

[75] Inventors: Margherita Corbellini, Milan; Alberto Greco, Dresano, both of Italy

[73] Assignee: Snamprogetti, S.p.A., Milan, Italy

[21] Appl. No.: 926,518

[22] Filed: Jul. 20, 1978

Related U.S. Application Data

[63] Continuation of Ser. No. 763,077, Jan. 27, 1977, abandoned.

[30] Foreign Application Priority Data

Jan. 30, 1976 [IT] Italy .............................. 19748 A/76
Jul. 13, 1976 [IT] Italy .............................. 25257 A/76

[51] Int. Cl.$^2$ .......................... C08F 4/64; C08F 4/68
[52] U.S. Cl. .............................. 252/442; 252/429 L; 252/441; 526/114; 526/115; 526/116; 526/119; 526/157; 526/158
[58] Field of Search ................... 252/429 C, 441, 442; 423/492; 526/158

[56] References Cited

U.S. PATENT DOCUMENTS

| | | | |
|---|---|---|---|
| 3,010,787 | 11/1961 | Tornquist ........................... | 423/492 |
| 3,146,224 | 8/1964 | Coover et al. ................... | 423/492 X |
| 3,280,093 | 10/1966 | Coover et al. ................... | 423/492 X |
| 3,658,723 | 4/1972 | Roberts .............................. | 252/441 |

OTHER PUBLICATIONS

Timms, "Synthetic Reactions of Metal Atoms at Temperatures of 10° to 273° K.", Angewandte Chemie, vol. 14, No. 5, pp. 273-277, May, 1975.

*Primary Examiner*—Patrick Garvin
*Attorney, Agent, or Firm*—Morgan, Finnegan, Pine, Foley & Lee

[57] ABSTRACT

A novel catalyst system for the polymerization or copolymerization as the case may be, of alpha-olefines is disclosed, which comprises a cocatalyst which is an aluminum-organic compound and a catalyst proper which is obtained by reacting metal vapors (such as vapors of Mg, Al, Ti, V, Cr, Mn, Fe or their alloys) with Ti or V compounds, a halogen donor and a hydrocarbonaceous inert diluent being possibly present. Another aspect of the invention is the conduct of the polymerization, or copolymerization, run proper. Numerous examples of practical application of the catalyst preparation and use are given and the advantages of the novel approach shown.

5 Claims, No Drawings

METHOD FOR THE POLYMERIZATION OF OLEFINES AND MEANS SUITABLE THERETO

This is a continuation of application Ser. No. 763,077 filed Jan. 27, 1977, now abandoned.

This invention relates to a novel catalytic composition based on transition metals and adapted for use in the polymerization of mono- and diolefines, as well as to the method of its preparation.

A second object of the present invention is the application of said catalytic composition to the polymerization and copolymerization of ethylene with higher alpha olefines, with high yields of polymer relative to the employed transition metal.

Such a catalytic composition is composed of an organic-metallic compound of aluminum (co-catalyst) and by a second compound (catalyst) as obtained by reaction of vapors of metals, to be specified hereinafter, with compounds of titanium or vanadium possibly in the presence of a halogenated compound and of an inert hydrocarbonaceous diluent.

In order to simplify the foregoing, and without any limitation:

1. The organic-metallic compound of aluminum has the general formula Al $R_n X_{3-4}$, wherein R is an alkyl, an aryl or a hydrogen atom, X is a halogen, and n is an integer from 1 to 3.
2. The metal vapor, as obtained by heating the metal concerned in a high vacuum, is preferably selected from among Mg, Al, Ti, V, Cr, Mn, Fe or their alloys.
3. The compounds of Ti, or of V, are composed of inorganic or organic salts, complexes or compounds of the above listed metals, in which the metal has a valency higher than 3.
4. The halogenated compound can be either organic or inorganic, provided that it is capable of yielding halogen (mobile halogen) to the metal indicated at (2) above or to the Ti- or V-compound indicated at (3) above or under the working conditions which are used.
5. The inert carbonaceous diluent is composed of aliphatic, aromatic or mixed compounds, provided that they are liquid under the adopted working conditions.

Under the adopted operating conditions the metal as at (2) above is vaporized, preferably in a vacuum, by an appropriate heating system (with electric resistors, electron beams, by induction and also by using high frequencies, by laser beams, by electric sparks, by voltaic arc and so forth). The vapors emerging from the metal surface are passed into a liquid which contains the compounds indicated at (3) possibly in union with the compounds at (4) and (5) above.

Such a liquid must be cooled to a temperature which is low enough to limit its evaporation so as consequently to permit the maintenance of the degree of vacuum which is required for the vaporization of the metal at temperatures which can be attained by the adopted heating system. Such a catalyst composition is capable of polymerizing and copolymerizing with very good yields ethylene and higher alpha olefines to high-density polyethylene, and to isotactic polypropylene, respectively, and is likewise capable of polymerizing butadiene to 1,4-trans-polybutadiene, and isoprene to 1,4-cis-polyisoprene.

As regards ethylene, and this is a second aspect of the present invention, a few of the catalyst compositions in question are capable of displaying an exceptional activity in polymerization runs. More particularly, when the catalyst is prepared from Mg vapors, the compound as per item (3) above is based on Ti, and the halogenated compound as per (4) above is present, it has been surprisingly found that extremely high yields can be obtained when working with an atomic ratio of Mg to Ti equal to or higher than 4 and with an atomic ratio of X to Mg equal to, or higher than 2, wherein X is the mobile halogen as defined at (4) above.

The above specified catalyst affords substantial advantages over other catalysts adapted for use in the polymerization of ethylene, in high yields and of ethylene with other higher alpha-olefines. More particularly: the activity (in terms of kilograms of polymer per gram of Titanium as produced in one hour with an atmosphere of ethylene under the conditions set forth in the examples) is extremely high, in the order of magnitude of 230 kilograms; the synthesis of the catalyst involves raw materials which are particularly simple and which can be standardized (differently from many supports as employed in other catalyst compositions which can be difficult to characterize from a phisico-chemical standpoint) and thus gives rise to catalysts having an activity which is both homogeneous and reproducible. The preparation technology of the catalyst is both simple and quick; the catalyst can be employed as prepared, in union with the cocatalyst, in the slurry polymerization of ethylene without any subsequent separations, filtrations or elutions. More particularly, all the transition metal employed is converted into an active catalyst; the catalyst can be employed, after having been dispersed on an inert support, which latter can even be the polyolefine as such, in the polymerization of ethylene in the gaseous state and thus without any hydrocarbonaceous dispersant being present; the adjustment of the molecular weight with hydrogen over a wide molecular weight range (MFI 0.1 to MFI 15) does not involve yield losses of polymer with respect to the transition metal.

More particularly, an object of the present invention is a catalyst system having the above indicated composition which makes it possible to overcome the above enumerated drawbacks and which, in use, affords the following advantages:
  obtainment of high yields of polymer relative to the transition metal;
  a morphologically homogeneous polymer;
  an easy adjustment of the molecular weight of the polymer;
  use in the polymerization in gaseous phase with the obtainment of high yields.

As outlined above, such a catalyst system comprises an organic metallic compound of aluminum and a composition as obtained by reaction between vapors of metallic magnesium, the titanium compound and a halogen-donor, selected from among the halogenated organic and inorganic compounds. It is known, inter alia, that titanium trichlorides can be prepared by reduction of $TiCl_4$ with the following procedures:

(a) with hydrogen under drastic conditions (500° C.–700° C.). The products obtained, due to the high temperature which has been used, are poorly active in the polymerization of olefines.

(b) with metals such as aluminum, antimony, and others, at temperatures equal to or higher than 200° C. In this case, not all of the metals are suitable in that for many of them the reaction takes place in a limited manner only or it does not go on at all. It is correct that such a defect can be obviated by using polar solvents, such as DMF, THF, dimethoxyheptane, but in such a case the final titanium trichloride is complexed with the polar solvent and exhibits no interest from a catalytic standpoint. Also the use of a liquid amalgam can prevent this drawback (U.S. Pat. No. 3,658,723 to DOW CHEM.) but all the metals have a very limited solubility in mercury so that such a procedure requires a large use of this metal which can be separated from the titanium trichloride with difficulty. These products, however, do not show much activity in polymerization.

(c) with metal-alkyls, a method which permits the use of moderate temperatures, but which uses comparatively expensive materials, which also are extremely reactive and hazardous. With this method it is not possible to use transition metals the alkyls of which have no sufficient stability to be practically used.

(d) with carbonyls of low-valency transition metals, as described in the U.S. patent application Ser. No. 568,170, filed Apr. 15, 1975 and now abandoned.

There is the advantage of obtaining the reduction with metals which would not react as such, but this method is limited to the transition metals and, among these, only to those which give stable carbonyls. The as-obtained titanium chlorides display a fair catalyst activity in the polymerization of unsaturated hydrocarbons, either alone or in admixtures.

An important aspect of the present invention is thus also a method which makes it possible to obtain titanium trichlorides without suffering from any of the shortcomings indicated above.

Such a method consists in providing soluble atoms of a metal by a procedure of vaporization in a high vacuum and condensation in an $MCl_4$ (M being either Ti or V), either pure or diluted in inert solvents, these latter being kept at a low temperature.

The principal advantage of such a procedure is that it can be applied generally, that is to say that any metal can be used, either a transition metal or another metal.

In addition, there is the advantage of obtaining products which have had a controlled thermal history and thus have differentiated physical properties, and consequently different catalytic activities, many metals being controllably and simultaneously covaporizable.

The products thus obtained, which are yet a further aspect of the present invention, can find their use as catalysts for the polymerization and copolymerization of olefines using the aluminum-alkyls as cocatalysts.

According to the invention, the trichlorides of Ti or of V are obtained by reacting $MCl_4$ with a metal, preferably selected from among Al, Mg, Cr, Mn, Fe, V, Ti.

The vaporization is carried out in a very high vacuum, preferably between $10^{-3}$ Torr and $10^{-6}$ Torr at temperatures which vary according to the metal which is used, usually from 800° C. to 2500° C., as disclosed by P. L. Timms, Angew. Chem., 14, 273 (1975).

The metal vapors are reacted with an $MCl_4$ at a temperature in the range from $-80°$ C. to $+20°$ C., preferably between $-60°$ C. and $-20°$ C.

The reaction can take place with $MCl_4$, either pure or diluted with inert solvents selected from among aliphatic or aromatic, saturated or unsaturated hydrocarbons and the halogenated hydrocarbons, such as chlorohexane and fluorobenzene.

The choice of the solvent or the solvent mixture is governed by the conditions of use (temperatures of solidification and vaporization under the pressure which has been adopted).

It has been found, moreover, that, if in the above mentioned preparation, a high ratio of Mg to Ti is adopted and the reaction is carried out in the presence of a halogen donor, it becomes possible to obtain a composition which, together with an organic metallic compound of aluminum, provides outstandingly good results in the high-yield polymerization of alpha-olefines, particularly of ethylene, as such or in admixture with one or more of its higher homologs.

More particularly, such a composition is obtained by vaporizing magnesium or an alloy thereof, then passing the vapor into an inert diluent which contains the titanium compound and the halogen-donor.

The vaporization of magnesium is preferably carried out in a vacuum, from $10^{-1}$ Torr to $10^{-4}$ torr, at a variable temperature, consistently with the pressure used, of from 500° C. to 1200° C.

The metallic vapors are passed into a solution, kept stirred, of the titanium compound and the halogen-donor, at a temperature higher than the freezing point and lower than the boiling point of the solution.

As outlined above, results useful to the ends of a high-yield polymerization of alpha-olefines are obtained if a high ratio of Mg to Ti is adopted, especially if such a ratio is equal to, or higher than, 4. Concurrently, the presence is necessary of a halogen-donor, selected from among the organic or inorganic halogenated compounds, which is employed in an excess over the magnesium; it is preferred to use ratios of the halogenated compound to the magnesium equal to, or higher than, 2. The condensation of the magnesium vapors is carried out in an inert diluent, selected from among the aliphatic, or the aromatic hydrocarbons.

In its turn, the titanium compound is selected from among the compounds of tetravalent titanium (trivalent or metallic-organic), preferably soluble in the selected diluent, whereas the halogenated compound, as outlined above, can be selected from among the organic or inorganic halides; a special emphasis can be put on the alkyl and aryl halides. At the end of the reaction, a very fine slurry is obtained, which can be used as such in polymerization.

The polymerization reaction, as outlined above, is carried out in the presence of a catalyst system composed by the suspension as obtained beforehand, in union with an organic metallic compound of aluminum, in a hydrocarbonaceous solvent, which can be the same as that employed in the above described preparation.

The working temperatures vary from 20° C. to 200° C., preferably between 50° C. and 200° C., under pressures which are in the range between 1 and 20 atmospheres. As an alternative, when it is desired to carry out the polymerization reaction in the gaseous state, it is enough to disperse the catalyst within a low-boiling solvent, so that the latter can easily be withdrawn. The catalyst, in such a case, can also be dispersed on an inert solid support, and the latter can be composed of the polyolefine itself. The conditions which can be adopted for the polymerization in the gaseous phase provide a temperature range which is maintained below the melting point of the olefine and in the particular case of the polymerization of ethylene, the temperature range which is preferred is between 40° C. and 90° C. Pressures are preferably selected between 1 and 40 atmospheres. Hydrogen can be employed as a regulator of the molecular weight.

EXAMPLE 1

Preparation of the mixture 3 TiCl$_3$. AlCl$_3$. A rotary flask is used, at the center of which a tungsten filament is arranged, which is connected to a source of electric power. Under the flask, a cooling bath is horizontally positioned. In the top portion of the apparatus there are a nitrogen and a vacuum fitting. Within the spirally wound tungsten filament there are placed 160 milligrams of pure aluminum in flakes. The flask is charged under nitrogen with 250 mls of anhydrous decane, containing TiCl$_4$ equal to 30% of the solvent. The rotary flask is cooled with the $-40°$ C. bath, then vacuum is applied with a diffusion pump until reaching $10^{-4}$ Torr. Once these conditions have been attained, the filament is heated until the metal is vaporized. The vaporized metal immediately reacts with TiCl$_4$, giving a very fine dark-brown precipitate. On completion of the vaporization, the flask is pressurized again and brought to ambient temperature by feeding nitrogen, then the suspension is brought to 150° C. during three hours. Upon filtration and drying, the as-obtained violet product is analyzed:

| For AlCl$_3$ . 3 TiCl$_3$ | Ti% | Al% | Cl% |
| --- | --- | --- | --- |
| Calcd. | 24.12 | 4.52 | 71.36 |
| Found | 24.01 | 4.90 | 69.80 |

EXAMPLE 2

The same apparatus and procedure of Example 1 are used. There are charged 190 milligrams of metallic pure Mg in wire form and 250 mls octane, containing 2% of TiCl$_4$. Upon cooling at $-60°$ C. and attaining a vacuum of $10^{-4}$ Torr, the vaporization of the metal is started, and it takes five minutes. A fine brown-violet precipitate is formed. The flask is restored to ambient pressure and temperature. A sample is brought to 125° C. during 4 hours, whereafter the slurry is filtered and the violet precipitate is washed with n-heptane until completely discharging the TiCl$_4$, then the solid product is analyzed after having dried it in a vacuo (2 grams):

| For MgCl$_2$ . 2 TiCl$_3$ | Ti% | Mg% | Cl% |
| --- | --- | --- | --- |
| Calcd. | 23.76 | 5.94 | 70.28 |
| Found | 22.97 | 5.8 | 67.1 |

The two samples, the untreated one and the treated one, have, as seen through X-ray analysis, a gamma structure.

EXAMPLE 3

The same apparatus and the same procedure as in Example 2 are used, adopting a concentration of TiCl$_4$ in n-octane of 14%.

A brown-violet product is obtained, which is filtered, washed with n-heptane until TiCl$_4$ is discharged, then re-slurried in n-heptane and analyzed. The analysis gives Mg$_1$Ti$_{1.84}$Cl$_4$.

EXAMPLE 4

The same apparatus and the same procedure as disclosed for Example 1 are used. There are charged 0.240 grams of metallic magnesium in wire form and 300 mls of n-octane containing 0.07% of TiCl$_4$ and 12% of n-chlorohexane. Upon cooling at $-60°$ C., a vacuum of $10^{-4}$ Torr is made and magnesium is vaporized during 7 minutes. A solid, pale-brown product is formed, which is collected on a filter, washed with n-heptane and kept at 100° C. in such a solvent during two hours. The analysis shows the following molar composition: Mg$_{3.1}$Ti$_1$Cl$_{7.8}$.

EXAMPLE 5

The same apparatus and procedure as described in Example 1 are used.

There are charged 0.180 grams of metallic Mn in flakes and 250 mls of octane containing 2% of TiCl$_4$. Upon cooling at $-60°$ C., a vacuum of $10^{-4}$ Torr is attained and the vaporization of the metal is started, which is completed within 3 minutes. A brown-violet precipitate is formed. The flask is brought back to ambient temperature and pressure, then the suspension is filtered, washed with n-hexane until discharging the TiCl$_4$ completely, whereafter the product is dried in a vacuum and analyzed.

The analysis gives:

| For 2 TiCl$_3$ . MnCl$_2$ | Ti% | Cl% | Mn% |
| --- | --- | --- | --- |
| Calcd. | 22.0 | 65.30 | 12.63 |
| Found | 22.0 | 63.4 | 14.4 |

EXAMPLE 6

The same apparatus and procedure as disclosed in Example 1 are used. There are charged 0.25 grams of metallic Fe in shavings and 250 mls of anhydrous n-octane containing the 5% of TiCl$_4$. Upon cooling at $-50°$ C., a vacuum of $10^{-3}$ Torr is reached and the vaporization of the metal is started, which takes 5 minutes. A solid red-brown product is formed which is collected on a filter, washed with anhydrous hexane and dried under vacuum. There are obtained 1.87 grams of a product which has the following analysis:

| For FeCl$_2$ . 2 TiCl$_3$ | Ti% | Fe% | Cl% |
| --- | --- | --- | --- |
| Calcd. | 21.99 | 12.81 | 65.19 |
| Found | 21.73 | 12.70 | 66.90 |

EXAMPLE 7

The same apparatus and procedure as disclosed in Example 1 are used. There are charged 0.120 grams of Mg wire and 250 mls of n-octane containing 3 mls of VCl$_4$. Upon cooling at $-60°$ C., a vacuum of $10^{-3}$ Torr is reached and the vaporization of the metal is started, which takes 5 minutes. A solid dark-brown product is formed, which is washed with n-heptane to remove the excess VCl$_4$ and reslurried in n-heptane. The analysis gives Mg$_1$V$_{2.1}$Cl$_{3.80}$.

EXAMPLE 8

The same apparatus and procedure as disclosed in Example 1 are used. There are charged 1 gram of metallic chromium in lumps and 250 mls. of n-heptane, containing 10 mls of TiCl$_4$. Upon cooling at $-80°$ C., a vacuum of about $10^{-4}$ Torr is reached and the vaporization of the metal is started, which takes 20 minutes to be completed. A solid greenish product is formed, which is collected on a filter and washed with heptane to remove the excess of TiCl₄ and reslurried in heptane. The analysis gives:

| For CrCl₃ . 3TiCl₃ | Ti% | Cr% | Cl% |
|---|---|---|---|
| Calcd. | 23.19 | 8.37 | 68.44 |
| Found | 23.40 | 8.20 | 67.60 |

EXAMPLE 9

A 5-liter autoclave is charged with 2 liters of anhydrous n-heptane, containing the catalyst as prepared according to Example 3 in the concentration of 0.03 milligramatoms of Titanium and 4 milligramatoms of Al(iso Bu)₃. The mixture is brought to 85° C., then there are charged 5 kilograms per sq. centimeter of hydrogen and as much of ethylene. Polymerization is carried out during four hours, while maintaining the total pressure constant by addition of ethylene. On completion of the polymerization, the slurry is centrifuged and the polymer is dried in a vacuum at 50° C. during four hours, then weighed.

There are obtained 400 grams of a white polymer, equivalent to a specific yield of 6,440 grams of polymer per gram of Ti per hour and per atmosphere of ethylene, having an MFI=0.60.

EXAMPLE 10

The procedure is the same as in Example 9, using as the catalyst the sample described in Example 1, in the concentration of 0.60 milligramatoms per liter of titanium and as co-catalyst Al(iso Bu)₃ in the concentration of 4 milligramatoms per liter. There are charged 5 kilograms per sq. centimeter of hydrogen and 5 kilograms per sq. centimeter of ethylene; the polymerization is carried out under a constant pressure by feeding in ethylene during four hours and there are obtained 120 grams of a white polymer, which corresponds to a specific yield of 1,030 grams of polymer per gram of Ti per hour and per atmosphere of ethylene, having an $MFI_{2.16}=1.5$ ($MFI_{21.6}/MFI_{2.16}=49.4$).

EXAMPLE 11

A 2-liter autoclave is charged with 1 liter of anhydrous and deaerated n-hexane, containing 20.8 milligrams of a catalyst according to Example 6, equal to 0.0941 milligramatoms of titanium and 4 milligramatoms of Al(iso Bu)₃, per liter. 20 kg sq. cm of hydrogen and 20 kg/sq. cm of ethylene are charged. The temperature is raised to 85° C. and the pressure is maintained constant by continuously feeding in ethylene. After 2 hours of polymerization, the reaction is cooled, the autoclave is vented and the polymer is centrifuged, dried under vacuum at 50° C. and weighed. There are obtained 320 grams of a polymer having $MFI_{2.16}=0.12$ ($MFI_{21.6}/MFI_{2.16}=44.7$). Yield=1,750 grams per gram of Ti per hour and per atmosphere of ethylene.

EXAMPLE 12

The procedure is the same as in Example 9, using as the catalyst the product described in Example 5, in the concentration of 0.10 milligramatoms per liter of titanium. As cocatalyst there is used As(iso Bu)₃ in the concentration of 4 milligramatoms per liter. Polymerization is carried out during 3 hours with 5 kilograms/sq.cm of hydrogen and 5 kgs/sq.cm of ethylene. There are obtained 390 grams of a polymer having an $MFI_{2.16}=0.35$ and an $MFI_{21.6}/MFI_{2.16}=35$.

Yield 2,700 grams per gram of Ti per hour and per atmosphere of ethylene.

EXAMPLE 13

The procedure is the same as for Example 9 using as the catalyst the sample as described in Example 8 in the concentration of 0.026 milligramatoms per liter of titanium and 2 milligramatoms per liter of Al(iso Bu)₃. There are charged 5 kilograms/sq.cm of hydrogen and 5.5 kilograms/sq.cm of ethylene. The temperature is raised to 85° C. and the pressure is maintained constant by feeding in ethylene continuously. After two hours of polymerization, the reaction is cooled, the autoclave is vented and the polymer is collected on a filter and dried in a vacuum at 50° C. and weighed. There are obtained 108 grams of a polymer having an MFI=0.11 corresponding to a yield of 3,900 grams of polymer per gram of Ti per hour and per atmosphere of ethylene.

TABLE 1 tabulates the specific activities as obtained in the polymerization of ethylene with the samples of TiCl₃ as prepared according to the Examples from 1 to 8 inclusive.

TABLE 1

| Catalyst | Example cat. | polym. | Specific activity gr. polym./ gr. Ti/ hr/atm C₂ | $MFI_{2.1}$ gr/10 mins. | $MFI_{21}$ $\overline{MFI_{2.1}}$ |
|---|---|---|---|---|---|
| 3 TiCl₃ . AlCl₃ | 1 | 10 | 1,030 | 0.62 | 49 |
| 2 TiCl₃ . MgCl₂ | 3 | 9 | 6,440 | 0.60 | 36 |
| 2 TiCl₃ . MnCl₂ | 5 | 12 | 2,700 | 0.35 | 35 |
| 2 TiCl₃ . FeCl₂ | 6 | 11 | 1,750 | 0.12 | 35 |
| 3 TiCl₃ . CrCl₃ | 8 | 13 | 3,900 | 0.11 | 47 |

EXAMPLE 14

A 100-ml, two-necked flask which has been purged beforehand with an inert gas is charged in an inert atmosphere with 30 mls of anhydrous n-hexane and then with 0.1 millimol of Ti according to Example 3, 0.1 millimol of Al(iso C₄H₉)₃ and subsequently with 7 grams of anhydrous isoprene twice distilled over LiH. The mixture contained in the flask is stirred during two hours at the temperature of 20° C. and then poured in 300 mls. of methyl alcohol containing 1% of an antioxidant. The coagulated polymer is dried under vacuum at room temperature overnight. Under these conditions, the yield of solid polymer is 6.3 grams, corresponding to 90% of the introduced monomer. The NMR analysis has shown the predominant presence of a structure of the 1,4-cis type.

EXAMPLE 15

A 200-ml pop bottle, which has previously been purged with an inert gas, is charged in an inert atmosphere with 90 mls of anhydrous n-hexane and then with 0.5 millimol of V according to Example 7 and 1 millimol of AlEt₃. The bottle is stoppered with a neoprene plug and with a perforated crown cap so as to be able to introduce a hypodermic needle. At this stage, by means of a hypodermic needle directly welded to a metal bottle which contains butadiene, there are introduced 14 grams of a monomer in liquid form. The pop-bottle is placed in a rotary bath thermostatically maintained at the temperature of 20° C. during one and a half hour. On completion, the pop-bottle is opened and its contents are discharged in half liter of methanol which contains 1% of ionol. The coagulated polymer is dried in a vacuum during 16 hours. Under these conditions, the yield of solid polymer is 1.8 grams, corresponding to 13% of the introduced monomer. The IR examination has shown a structure which was essentially integrally 1,4-trans.

EXAMPLE 16

A 2-liter autoclave is charged with one liter of anhydrous and deaerated n-hexane containing 340 milligrams of catalyst made according to Example 8, corresponding to 1.66 milligramatoms of titanium and 7 milligramatoms of AlEt$_3$ per liter. There are charged 8 kilograms/sq. centimeter of propylene. The temperature is raised to 65° C. and the pressure is kept constant by feeding in propylene during 6 hours. Upon cooling the autoclave, the polymer is collected on a filter and dried in a vacuum at 50° C. There are obtained 135 grams of a polymer having a crystallinity (RX) of 42% and a residue of 85% after extraction with hexane.

EXAMPLE 17

Preparation of the catalyst at a ratio Mg/Ti higher than 0.5. The same apparatus as described in Example 1 is used. The tungsten spiral is charged with 800 milligrams of Mg in needles. The 500-ml flask is charged under nitrogen with 130 mls. of anhydrous and deaerated n-heptane, 20 mls of 1-chlorohexane equal to 146 millimol and 0.15 ml of TiCl$_4$ corresponding to 1.35 millimol. The flask is cooled to $-70°$ C., a $10^{-3}$ Torr vacuum is applied, then the spiral is heated so as to vaporize the metal. A very fine grey-brown precipitate is formed. On completion of the vaporization (about 15 minutes) nitrogen is introduced in the apparatus and the flask is brought back to ambient temperature, stirring being not discontinued. The analysis on the slurry has given the following molar ratios:
—Mg to Ti=24;
Cl to Ti=45

Polymerization

A 5-liter autoclave having an anchor-stirrer is charged with 2 liters of anhydrous and deaerated n-heptane, 4 millimols of Al(iso Bu)$_3$ and a quantity of catalyst, prepared according to the present Example, corresponding to 0.01 milligramatoms of elemental titanium. The temperature is raised to b 85° C., then there are charged 5 kgs/sq.cm of hydrogen and 3.5 kgs/sq.cm of ethylene. Ethylene is continuously fed in so as to keep the total pressure constant during one hour. There are obtained 350 grams of polyethylene having MFI=9.8 grams/10 mins and d=0.9690 grams per cubic centimeter. The specific activity is 200,000 grams of polymer per gram of titanium per hour and per atmosphere of ethylene.

EXAMPLE 18

The same method of synthesis of Example 17 is carried out, using bromohexane as the halogen-alkyl. A slurry is obtained, having the following analysis:
Mg to Ti ratio =16.5;
(Br+Cl) to Ti ratio=33.

In the polymerization of ethylene, under the conditions of Example 17, there have been obtained 165 grams of a polymer having an MFI=4.18 grams/10 mins. corresponding to a specific activity of 98,000 grams per gram of Ti per hour and per atmosphere of ethylene.

EXAMPLE 19

With the procedure of Example 17 and the same reactants, there have been prepared several catalysts having different Mg to Ti ratios, the activities of which in the polymerization of ethylene, carried out under the conditions of Example 17, are tabulated in TABLE 2.

TABLE

| $\dfrac{Mg}{Ti}$ | Specif. activity in grams polym. per gram polym. per hour and per atmos. of $C_2-$ | MFI grams/ 10 mins. | App. d (sp. grav.) grs/cu. cm | $\dfrac{MFI_{21}}{MFI_{2.1}}$ |
|---|---|---|---|---|
| 5.0 | 47,000 | 16,0 | 0.25 | 22 |
| 9.0 | 57,000 | 6.8 | 0.23 | 34 |
| 13.4 | 90,000 | 11.4 | 0.22 | 35 |
| 16.5 | 95,000 | 11.3 | 0.24 | 28 |
| 22.7 | 125,000 | 10.3 | 0.22 | 36 |
| 25.0 | 200,000 | 9.8 | 0.24 | 23 |
| 35.0 | 280,000 | 10.1 | 0.20 | 35 |

EXAMPLE 20

The same synthesis procedure of Example 17 is used, with the following reactants:
Mg: 1,100 milligrams (46 milligramatoms)
TiCl$_2$(O$_{iso}$Pr)$_2$=0.2 ml corresp. to 0.68 millimol, and
C$_6$H$_{16}$Br=20 mls corresp. to 142 millimols in 200 mls nor.octane.

After the reaction, the analysis in the suspension is:
Mg to Ti=48;
(Br+Cl) to Ti=83.5

In the polymerization of ethylene under the conditions of Example 17 there have been obtained 265 grams of a polymer having an MFI=8.5 grams per 10 minutes, equal to a specific activity of 157,000 grams of polymer per gram of Ti per hour and per atmosphere of ethylene.

EXAMPLE 21

The same synthesis procedure as in Example 17 is used with the following reactants:
Mg: 1,050 milligrams (43 milligramatoms)
C$_6$H$_{13}$Cl 15 mls (110 milligramatoms)
Ti (O iso Pr)$_4$ 0.2 ml (0.67 milligramatoms) in 170 mls nor.octane.
P=0.05 mmHg; t=$-50°$ C.

On completion of the vaporization of the magnesium, the flask is filled with nitrogen and allowed to stand overnight. The suspension, upon analysis, gives:
Mg to Ti ratio=52;
Cl to Ti ratio=90

In the polymerization of ethylene, as carried out under the conditions described in Example 17, there are obtained 125 grams of a polymer having an MFI=6.7 grams per 10 mins. and a specific activity of 75,000 grams of polymer per gram of Ti per hour and per atmosphere of ethylene.

EXAMPLE 22

An apparatus similar to that described in Example 1 is used. In the tungsten filament there are arranged 1.096 grams of pure metallic magnesium wire, whereas the one-liter flask is charged with 130 cu.cm of anhydrous ligroin containing 1 millimol of TiCl$_4$ together with 66.7 millimols of SnCl$_4$. The magnesium is completely vaporized within 40 mins. with a vacuum of 0.09 Torr, by keeping the flask in rotation at $-60°$ C.--$70°$ C. The flask is restored to the ambient temperature and pressure and stirring is continued during one hour approximately. During this time, the slurry changes its color from dark brown to grey-white. Filtration is carried out on a porous G3 diaphragm, then washing with anhydrous heptane is effected and the solid is reslurried in heptane.

The analysis of the slurry gives the following results:
Ti=5.77 millimols per liter;
Mg=181 millimols per liter
Sn=170 millimols per liter;
Cl=731 millimols per liter

EXAMPLE 23

In the tungsten filament there is arranged 1.0 gram of pure magnesium wire. The flask is charged, in the order given, with 130 mls of anhydrous toluene and 1 millimol of $TiCl_4$, which imparts a yellow hue to the solvent. Then, there are added, at $-78°$ C., 2 millimols of diethylphthalate, dropwise. The solution passes from yellow to light green. There are then added 66.7 millimol of anhydrous $SnCl_4$ which imparts a yellow-orange hue: an orange oily substance settles on the flask bottom. Magnesium is vaporized during 40 mins. under a vacuum of 0.06 Torr by maintaining the flask in rotation at $-78°$ C. The flask is brought back to ambient temperature and pressure and kept stirred for about one hour. During this time the slurry passes from dark brown to yellow. The slurry is collected on a filter, washed with anhydrous heptane and reslurried in heptane.

The analysis of the slurry gives the following results:
Ti=7.74 millimols per liter;
Mg=235 millimols per liter
Sn=190 millimols per liter;
Cl=897 millimols per liter

EXAMPLE 24

In the tungsten filament there are arranged 809.5 milligrams of pure magnesium wire whereas the flask is charged with 100 mls of anhydrous toluene and one millimol of $TiCl_4$ which colors the solvent yellow. Then there are added at room temperature and with stirring 2 millimols of diethylphthalate. The solution takes a light green hue. There are further added 43.3 millimols of $SnCl_3nBut$ which imparts a yellow-orange hue and an oily substance is deposited on the flask bottom. Magnesium is evaporated during 40 mins. under a vacuum of 0.07 Torr by maintaining the flask in rotation at $-78°$ C. The flask is brought back to ambient pressure and temperature and stirring is continued during about 2 hours at room temperature. The slurry passes from dark brown to light grey during this period of time. Filtration, washing with anhydrous heptane and reslurrying in heptane are carried out.

The analysis of the slurry gives the following results:
Ti=7.18 millimols per liter;
Mg=66 millimols per liter
Sn=80 millimols per liter;
Cl=349 millimols per liter

EXAMPLE 25

970 milligrams of pure magnesium wire are placed on the tungsten. In the flask which contains 100 mls of anhydrous heptane and 1 millimol of $TiCl_4$, there are added at room temperature and with stirring 60 millimols of $SbCl_5$, distilled. The solution remains clear. By vaporizing magnesium, the suspension becomes yellow-brown: then, a white powder is formed which gradually darkens and passes to grey and eventually to black. Filtration, washing with anhydrous heptane and reslurrying in such solvent are carried out. The analysis of the slurry gives the following results:
Ti=4.60 millimols per liter;
Mg=226 millimols per liter
Sb=95 millimols per liter;
Cl=1,058 millimols per liter

EXAMPLE 26

There are placed on the tungsten filament 831.8 milligrams of pure magnesium wire. In the flask which contains 100 mls of anhydrous nor.heptane there are added at room temperature and with stirring, 51.3 millimols of distilled $POCl_3$ and 1 millimol of $TiCl_4$. A yellow precipitate is formed. Magnesium is vaporized while keeping the flask at $-78°$ C. The suspension is yellow-brown. The flask is brought back to ambient temperature and pressure and stirring is continued during 2 hours at room temperature. The suspension becomes pale yellow. Filtration, washing with nor.heptane and reslurrying in this latter solvent are effected.

The analysis of the slurry gives the following results:
Ti = 9.62 millimols per liter;
Mg = 126 millimols per liter
P = 390 millimols per liter;
Cl = 655 millimols per liter Ethylene polymerization tests with the catalyst mixtures as prepared according to Examples from 22 to 26 have been carried out according to Example 17 with a polymerization time of 2 hours with a pressure of hydrogen of 5 kilograms square centimeter and a pressure of ethylene of 5 kilograms per sq.cm. The results which have been obtained are tabulated in TABLE 3.

TABLE 3

| Catalyst accord. to Example | Specific activity in grams of polym. per grams of Ti per hour and per atmosph. of $C_2-$ | $MFI_{21}$ grams/ 10 min. | $\dfrac{MFI_{21}}{MFI_{2.1}}$ | Apparent spec. gravity grams/ cu. cm |
|---|---|---|---|---|
| 22 | 34,700 | 5.00 | 36 | 0.30 |
| 23 | 32,500 | 5.70 | 31 | not determ. |
| 24 | 13,000 | 2.90 | 32 | not determ. |
| 25 | 34,000 | 6.98 | 27 | 0.20 |
| 26 | 8,300 | 4.32 | 31 | not determ. |

EXAMPLE 27

A two-necked flask, purged with nitrogen is charged with 10 grams of powdered polyethylene, 50 mls of anhydrous and deaerated nor.hexane and 1.5 milligramatoms of $Al(isoBu)_3$.

Upon homogenization the mixture is allowed to stand during two hours, whereafter there are added, still under a nitrogen stream, 0.0075 milligramatoms of a catalyst such as titanium when prepared as disclosed in Example 17 together with 1.5 milligramatoms of Al(isoBu)$_3$. Hexane is completely distilled off in a vacuum at 60° C. The thusly prepared material is charged under nitrogen in a well dried 2-liter autoclave, which has been deaerated and kept under nitrogen atmoshpere. The autoclave is evacuated to remove nitrogen, whereafter ethylene is fed until reaching a gauge pressure of 1.5 kilograms per square centimeter and the temperature is raised to 80° C. During progress of polymerization, ethylene is fed in so as to keep constant the gauge pressure of 1.5 kilograms per square centimeter. The absorption of ethylene is checked by a rotameter. Polymerization is discontinued after 5 hours. During this period of time the absorption remains constant. There are obtained 84 grams of polyethylene corresponding to a specific activity of 16,500 grams of polymer per gram of Ti per hour and per atmosphere of ethylene.

EXAMPLE 28

The exact procedure as disclosed in the previous Example has been followed, with 2 kilograms per sq.cm of hydrogen as a molecular weight adjuster. After three hours of polymerization there are obtained 56 grams of a polymer having an MFI of 2.1 grams per 10 minutes.

EXAMPLE 29

Copolymerization of ethylene with butene-1 is carried out, using the catalyst disclosed in Example 17, the same procedure, the same polymerization condition and the same concentrations of catalyst as described in that Example. The feed of butene-1 is carried out concurrently with that of ethylene by introducing a quantity of butene-1 equal to 5% of that of ethylene, the gases being metered with calibrated fluxmeters. After one hour of polymerization there are obtained 290 grams of a copolymer having an MFI of 10 grams per 10 mins. and an apparent specific gravity, d=0.9580 grams per cu.cm. The specific activity is 170,000 grams of copolymer per gram of Ti per hour and per atmosphere of ethylene.

EXAMPLE 30

Copolymerization of ethylene with hexene-1 is effected using the catalyst described in Example 17 under the same conditions and concentrations as disclosed in the same Example.

The procedure is as follows:

an autoclave is charged with 1.8 liters of nor.heptane containing 8 grams of anhydrous and deaerated hexene-1.

the temperature is thermostatically maintained at 85° C.

the catalyst is charged (4 millimols of Al(isoBu)$_3$ and 0.01 milligramatom of catalyst such as titanium diluted with 200 mls of n-heptane. There are charged 5 kgs/sq.cm of hydrogen and 3.5 kgs/sq.cm of ethylene. During the feed of ethylene which is carried out continuously during the entire polymerization time (1 hour) to keep constant the total pressure, there are fed 8 grams of hexene-1 diluted in 100 mls.nor.heptane by a metering pump. After one hour of polymerization the gases are vented off, the copolymer is collected on a filter and dried. There are obtained 230 grams of a copolymer having an MFI=8.5 grams/10 mins and an app.spec.-grav., d=0.9576 grams per cubic centimeter. The obtained specific activity is: 136,000 grams of copolymer per gram of Ti per hour and per atmosphere of ethylene.

We claim:

1. A method for the preparation of a catalyst containing titanium trichloride or vanadium trichloride and useful in the polymerization and copolymerization of ethylene with higher alphaolefines, which comprises vaporizing another metal selected from the group consisting of Al, Mg, Cr, Mn, Fe, V and Ti under vacuum and reacting the vapors thus obtained with TiCl$_4$ or VCl$_4$ at a low temperature.

2. A method for the preparation of a catalyst as claimed in claim 1, wherein the vaporization of said other metal is carried out under a vacuum in the range between $10^{-1}$ and $10^{-6}$ Torr.

3. A method for the preparation of a catalyst as claimed in claim 1, wherein the reaction between the metallic vapors and TiCl$_4$ or VCl$_4$ takes place at a temperature in the range between −80° C. and +20° C.

4. A method for the preparation of a catalyst as claimed in claim 1, wherein the reaction takes place at a temperature in the range between −60° C. and −20° C.

5. A method for the preparation of a catalyst as claimed in claim 1, wherein the reaction between the metallic vapors and TiCl$_4$ or VCl$_4$ takes place in the presence of an inert diluent selected from the group consisting of aliphatic, saturated, unsaturated and halogenated hydrocarbons.

* * * * *